US008997047B2

(12) United States Patent
Follis et al.

(10) Patent No.: US 8,997,047 B2
(45) Date of Patent: Mar. 31, 2015

(54) DYNAMICALLY UPDATING CODE WITHOUT REQUIRING PROCESSES TO RESTART

(71) Applicant: International Business Machines Corporation, Armonk, NY (US)

(72) Inventors: David A. Follis, Hyde Park, NY (US); Timothy D. Kaczynski, Poughkeepsie, NY (US); Matthew J. Sykes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 13/714,383

(22) Filed: Dec. 13, 2012

(65) Prior Publication Data
US 2014/0173560 A1    Jun. 19, 2014

(51) Int. Cl.
*G06F 9/44* (2006.01)
*G06F 9/445* (2006.01)
(52) U.S. Cl.
CPC ... *G06F 8/71* (2013.01); *G06F 8/67* (2013.01)
USPC ........................................................ 717/122
(58) Field of Classification Search
None
See application file for complete search history.

(56) References Cited

U.S. PATENT DOCUMENTS

| 5,555,418 | A  | * | 9/1996  | Nilsson et al. ............... 717/153 |
| 6,327,584 | B1 | * | 12/2001 | Xian et al. ............................ 1/1 |
| 2006/0075002 | A1 | * | 4/2006  | Tarbell et al. ................. 707/204 |
| 2006/0206449 | A1 | * | 9/2006  | Fletcher et al. .................... 707/1 |
| 2009/0182779 | A1 | * | 7/2009  | Johnson ........................ 707/200 |
| 2010/0251339 | A1 |   | 9/2010  | Mcalister ................ G06F 21/00 |
| 2014/0040303 | A1 | * | 2/2014  | Ouyang et al. ................ 707/766 |

OTHER PUBLICATIONS

"How C++'s vector works: the gritty details", Internet article, Nov. 17, 2009 by Sirp.*

* cited by examiner

*Primary Examiner* — Don Wong
*Assistant Examiner* — Daxin Wu
(74) *Attorney, Agent, or Firm* — Ido Tuchman; Rahan Uddin

(57) ABSTRACT

A method, system and computer program for dynamically updating code managed by an authorized agent. The method includes executing multiple versions of agent code in system memory. One version of the agent code is executed as an active version and another version of the agent code is executed as an inactive version. Version numbers of the active and inactive versions of the agent code are stored in a reloadable module vector. Client instances previously bound to the inactive version of the agent code are bound to the active version of the agent code after comparing the version numbers of the active version of the agent code and the inactive version of the agent code. A portion of the system memory used by the inactive version of the agent code is deallocated when no client instances are bound to the inactive version of the agent code.

18 Claims, 3 Drawing Sheets

DYNAMICALLY UPDATING CODE WITHOUT REQUIRING PROCESSES TO RESTART

BACKGROUND

This invention relates to dynamically updating code managed by an authorized agent, and more particularly to a method and system of updating code managed by an authorized agent without requiring agent processes or unauthorized processes to restart.

In a software product, which can have several active instances at the same time on a given system or set of systems, a centralized agent process is often used to manage the individual instances. This agent process may keep track of the individual instances, and might also provide some set of services to the instances. In a system comprised of authorized (trusted) and unauthorized (untrusted) code, the agent will often provide a set of authorized services to the unauthorized instances. In the case where the agent provides services to the instances, the instances will bind to the agent, possibly exchanging details about which services are provided by the agent and how they are accessed.

If a system administrator wants to apply service to the agent, the instances typically must be updated with any changes to the services provided by the new agent code. Often, the agent is stopped to apply service, and then restarted, requiring the instances to restart and bind to the new agent. As a result, the instances are not available for some time and an outage occurs. In a system requiring services to be available continuously, this outage is unacceptable, and an alternative way of updating the agent code is required.

In current systems, the agent code uses a lock to indicate that unauthorized instances should wait before accessing the agent. This allows the agent a chance to update, knowing that there can be no instances running the code at this time. This causes work to back up in the instances while they cannot use the agent, possibly resulting in error messages to the user and/or an unacceptable wait time.

BRIEF SUMMARY

Accordingly, one example of the present invention is a method for dynamically updating code managed by an authorized agent. The method includes executing multiple versions of agent code in system memory. One version of the agent code is executed as an active version and another version of the agent code is executed as an inactive version. The method further includes storing version numbers of the active version of the agent code and the inactive version of the agent code in a reloadable module vector. The method further includes binding client instances, previously bound to the inactive version of the agent code, to the active version of the agent code after comparing the version numbers of the active version of the agent code and the inactive version of the agent code. The method further comprises deallocating a portion of the system memory used by the inactive version of the agent code when none of the client instances are bound to the inactive version of the agent code.

Yet another example of the present invention is a system for dynamically updating agent code managed by an authorized agent. The system includes a system memory and a computer processor coupled to the system memory. The system further includes an executing unit, which is also coupled to the computer processor. The executing unit executes multiple versions of agent code in the system memory. One version of the agent code is executed as an active version and another version of the agent code is executed as an inactive version. The system further includes a storing unit. The storing unit stores version numbers of the active version of the agent code and the inactive version of the agent code in a reloadable module vector. The system further includes a binding unit. The binding unit binds client instances previously bound to the inactive version of the agent code to the active version of the agent code after comparing the version numbers of the active version of the agent code and the inactive version of the agent code. The system further includes a deallocating unit. The deallocating unit deallocates a portion of the system memory used by the inactive version of the agent code when none of the client instances are bound to the inactive version of the agent code.

A further example embodiment of the present invention is a computer program product for dynamically updating code managed by an authorized agent. The computer program product includes computer readable program code configured to: execute multiple versions of agent code in a system memory, wherein one version of the agent code is executed as an active version and another version of the agent code is executed as an inactive version; store version numbers of the active version of the agent code and the inactive version of the agent code in a reloadable module vector; bind client instances previously bound to the inactive version of the agent code to the active version of the agent code after comparing the version numbers of the active version of the agent code and the inactive version of the agent code; and deallocate a portion of the system memory used by the inactive version of the agent code when none of the client instances are bound to the inactive version of the agent code.

BRIEF DESCRIPTION OF THE DRAWINGS

Embodiments of the invention will now be described, by way of example only, with reference to the following drawings.

DETAILED DESCRIPTION

Figure 1:
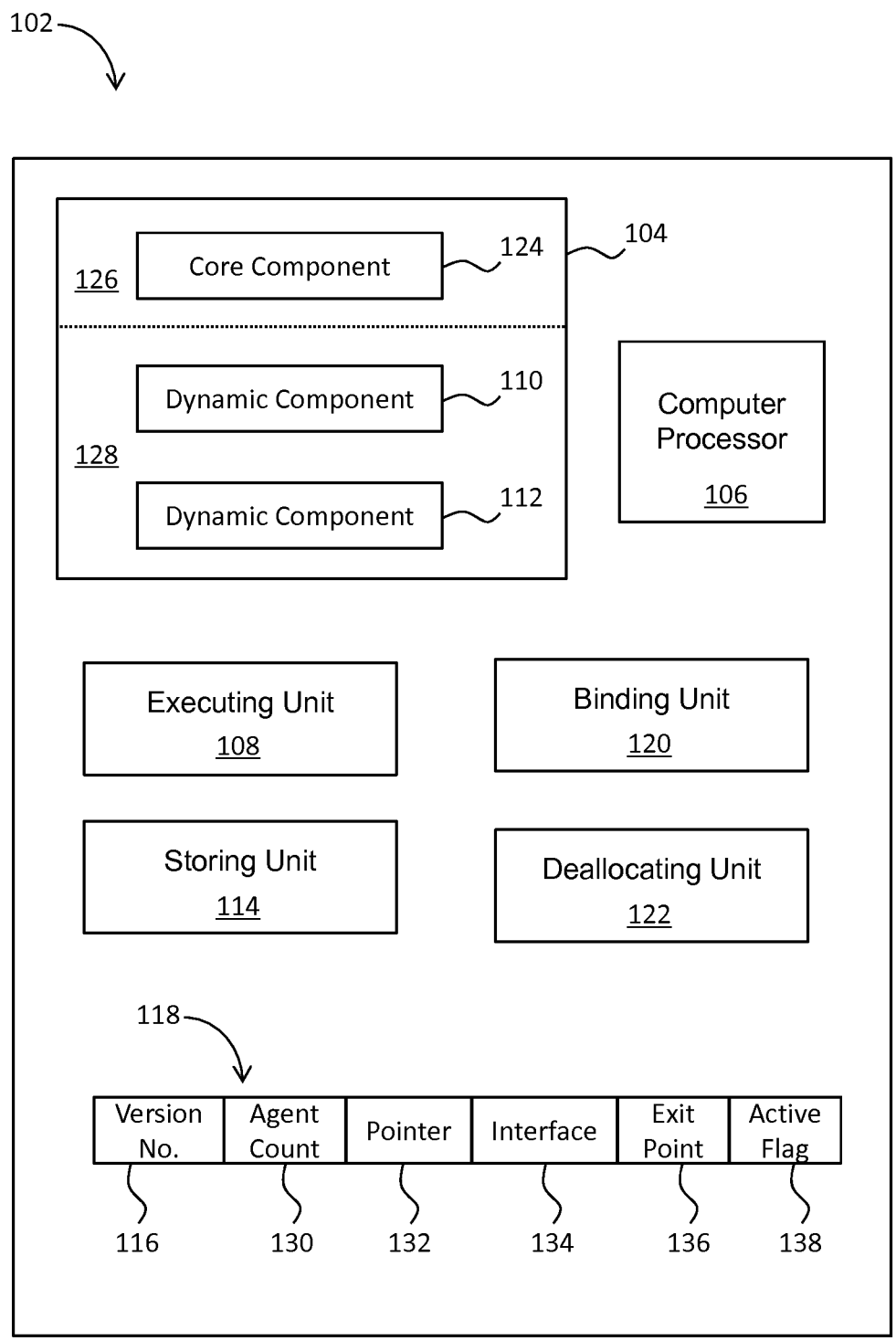
FIG. 1 shows a system for dynamically updating agent code managed by an authorized agent according to one embodiment of the present invention.

The present invention is described with reference to embodiments of the invention. Throughout the description of the invention reference is made to FIGS. 1-2B. When referring to the figures, like structures and elements shown throughout are indicated with like reference numerals.

In one embodiment, the method of updating software of an authorized agent process which manages unauthorized processes, updates software without requiring the agent process or unauthorized processes to restart. The method manages multiple versions of the agent code in memory, and manages its life cycle without interrupting the availability of the services provided to end users by the unauthorized processes.

FIG. 1 shows a system 102 for dynamically updating agent code managed by an authorized agent according to one embodiment of the present invention. The system may include a system memory 104, a computer processor 106, an executing unit 108, a storing unit 114, a binding unit 120, and a deallocating unit 122.

The executing unit 108 is coupled to the computer processor 106 and the executing unit 108 executes multiple versions of agent code in the system memory 104. One version of the agent code is executed as an active version 110 and another version of the agent code is executed as an inactive version 112.

The storing unit 114 stores version numbers of the active version 110 of the agent code and the inactive version 112 of the agent code in a reloadable module vector 118. The binding unit 120 binds client instances previously bound to the inactive version 112 of the agent code to the active version 110 of the agent code after comparing the version numbers of the active version 110 of the agent code and the inactive version 112 of the agent code.

The deallocating unit 122 deallocates a portion of the system memory 104 used by the inactive version 112 of the agent code when none of the client instances are bound to the inactive version 112 of the agent code.

In one embodiment of the invention, the computer processor 106 may be configured to store a core component 124 of the agent code in private storage 126 of the system memory 104 and a dynamic component of the agent code in common storage 128 of the system memory 108. The core component 124 of the agent code may be configured to update the dynamic component of the agent code.

The private storage 126 of the system memory 108 is configured to be used by a single executing process. The common storage 128 of the system memory is configured to be used by multiple executing processes. The computer processor 106 may load a new version of the agent code stored in the common storage 128 through the core component 124 of the agent code.

In one embodiment, the computer processor 106 may be configured to increment an agent count 130 associated with the new version of the agent code when the client instance is bound to the new version of the agent code.

In one embodiment, the computer processor 106 may be configured to store a pointer 132 to the dynamic component of the agent code in a reloadable module vector 118. The computer processor 106 is configured to expose, by the reloadable module vector 118, an interface 134 to the client instance to perform operating system functions through the dynamic component of the agent code. The agent code has authorization by an operating system to perform the operating system functions and the client instance does not have authorization by the operating system to perform the operating system functions.

In one embodiment, the computer processor 106 may be configured to register an exit point 136. The exit point 136 is driven when the inactive version 112 of a client instance terminates. The code located at the exit point decrements the agent count 130 for any reloadable module vector 118 that it was connected to. The inactive version 112 of the agent code is deallocated when the agent count 130 is decremented to zero.

In one embodiment, the computer processor 106 may be configured to designate the new version of agent code as active by comparing the version numbers of the new version of the agent code and the active version of agent code 110. If the version numbers are different, an active flag 138 may be associated with the new version of the agent code as true and an active flag 138 associated with the active version 110 of the agent code as false.

Figure 2A:
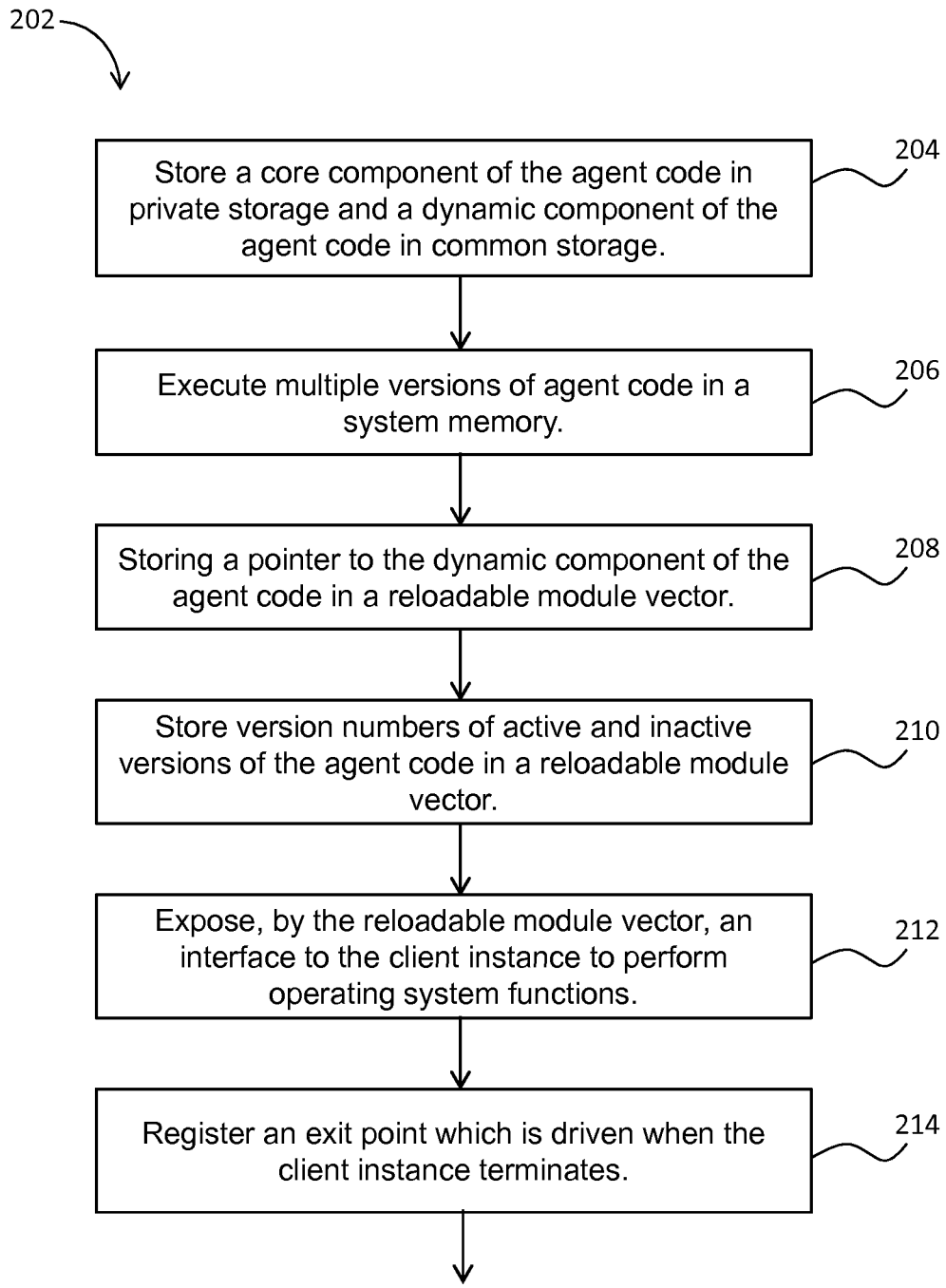
FIGS. 2A and 2B show a method for dynamically updating code managed by an authorized agent in accordance with one embodiment of the present invention.
Figure 2B:
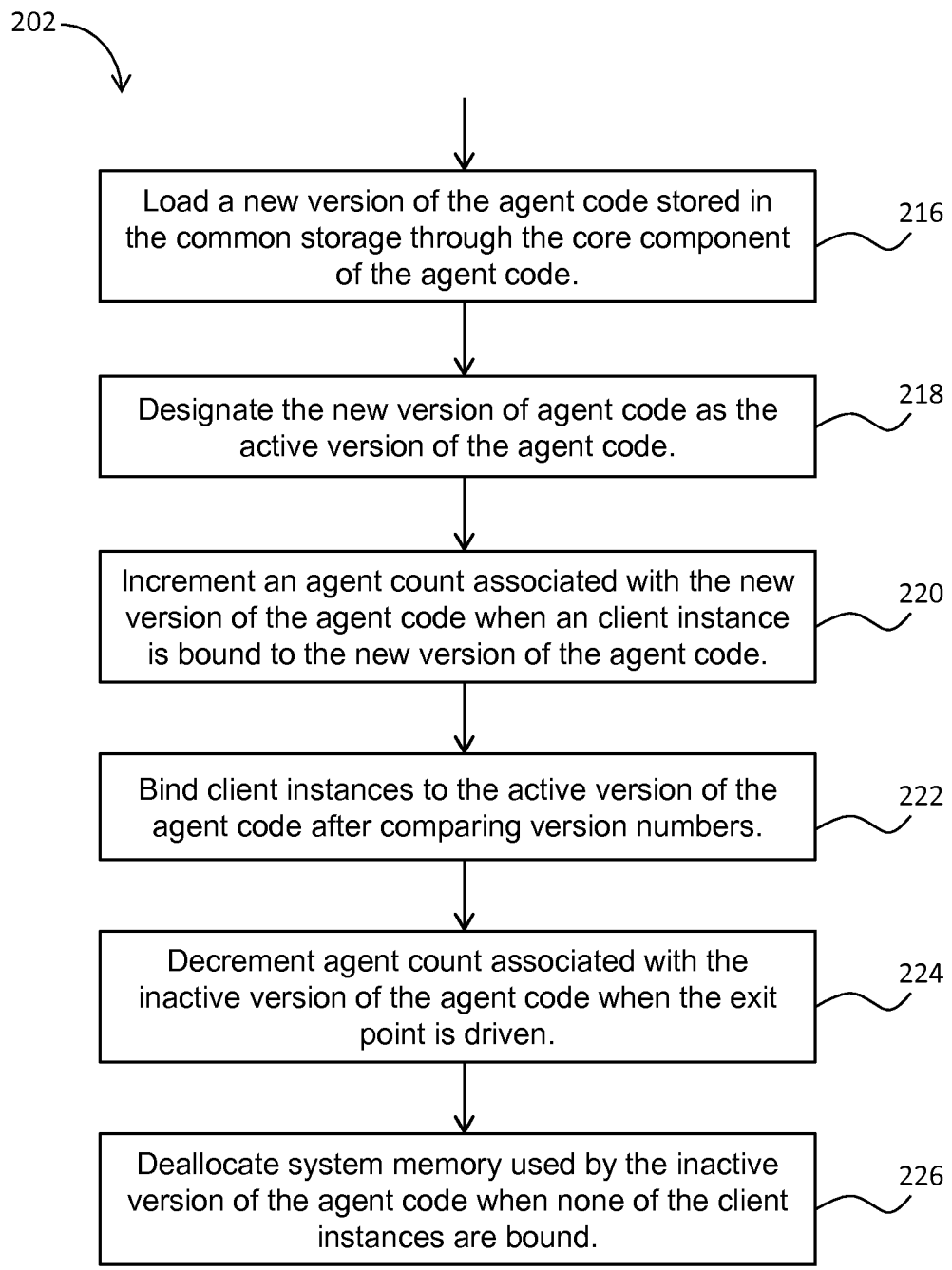

FIGS. 2A and 2B show a method for dynamically updating code managed by an authorized agent 202, in accordance with one embodiment of the present invention. The method includes storing step 204. During the storing step 204, a core component of the agent code is stored in the private storage of the system memory and a dynamic component of the agent code is stored in the common storage of the system memory.

The core component of the agent code may be configured to update the dynamic component of the agent code. The private storage of the system memory may be configured to be used by a single executing process. The common storage of the system memory may be configured to be used by multiple executing processes. In one embodiment, the software comprising the agent may be divided into two pieces: the part loaded into private storage and the part loaded into common storage.

The code loaded into private storage, the core, is responsible for initializing the address space and loading the part which is loaded into common storage. The core may also listen for operator commands sent by the system administrator. The code loaded into common storage, the dynamic extension, provides services which unauthorized processes can use. The size of the core is very small compared to the size of the dynamic extension. The core cannot be replaced without restarting the agent. After storing step 204 is completed, the method continues to executing step 206.

At executing step 206, multiple versions of agent code may be executed in the system memory. One version of the agent code may be executed as an active version and another version of the agent code is executed as an inactive version. After executing step 206 is completed, the method continues to storing step 208.

At storing step 208, a pointer to the dynamic component of the agent code is stored in the reloadable module vector. The reloadable module vector contains the entry point address of the dynamic extension, the version information for the dynamic extension, the instance number, the active/inactive flag, and the count of other address spaces which are using this dynamic extension. After storing step 208 is completed, the method continues to storing step 210.

At storing step 210, version numbers of the active version of the agent code and the inactive version of the agent code may be stored in the reloadable module vector. After storing step 210 is completed, the method continues to exposing step 212.

At exposing step 212, an interface to the client instance to perform operating system functions through the dynamic component of the agent code is exposed by the reloadable module vector. The agent code has authorization by an operating system to perform the operating system functions and the client instance does not have authorization by the operating system to perform the operating system functions. After exposing step 212 is completed, the method continues to registering step 214.

At registering step 214, an exit point is registered. The exit point is driven when the client instance terminates. In another embodiment of the invention, an exit point is driven when the inactive version of the agent code terminates. In one embodiment, when an unauthorized process calls the registration entry point, part of the registration process creates an exit which is driven when the unauthorized process terminates. On a z/OS operating system, for example, this can be accomplished by registering a Resource Manager with the z/OS.

The registration code locates the current reloadable module vector in a well-known location, and if it is active, attempts to increment the count of address spaces which are using the dynamic extension. The active check and the increment should be done atomically, and this can be done on z/OS using the compare-and-swap instruction. If the count is incremented successfully, this unauthorized process is connected to the agent, and can use services that the agent provides pending any additional authorization checks which may be imposed by the agent. The registration code records the fact that the unauthorized process is connected to this specific reloadable module vector, by recording the instance number of the vector. On z/OS this can be done by registering a system level name token, recording the STOKEN of the unauthorized process and the instance number from the vector. After registering step 214 is completed, the method continues to loading step 216.

At loading step 216, a new version of the agent code is loaded into common storage through the core component of the agent code. In one embodiment, if the system administrator wishes to provide service to the agent, new agent code is loaded onto the storage on the system, and an operator command is issued against the agent instructing it to reload. The agent will load the new agent code and load the dynamic extension into common storage. If the version number in the dynamic extension is different from the version number of the current dynamic extension, the current dynamic extension will become the old dynamic extension, and the new dynamic extension will become the current dynamic extension. A new reloadable module vector is created. The instance number of this new reloadable module vector is one greater than the current reloadable module vector, and the new dynamic extension address is set in the new reloadable module vector. After loading step 216 is completed, the method continues to designating step 218.

At designating step 218, the new version of agent code is designated as the active version of the agent code. In one embodiment, the new version of agent code is designated as the active version of the agent code by comparing the version numbers of the new version of the agent code and the active version of agent code. If the version numbers are different, an active flag is set to associate the new version of the agent code as true and an active flag is set to associate the active version of the agent code as false. After designating step 218 is completed, the method continues to incrementing step 220.

At incrementing step 220, an agent count associated with the new version of the agent code is incremented when the client instance is bound to the new version of the agent code. In one embodiment, the count starts at zero when there is no address spaces connected. The instance number is incremented each time a new reloadable module vector is created for the agent instance. The core registers entry points with the system which allow unauthorized processes to register with the authorized agent. In one embodiment, this can be accomplished on z/OS using PC routines. The address of the reloadable module vector is stored at a well-known location in storage. After incrementing step 220 is completed, the method continues to binding step 222.

At binding step 222, client instances, previously bound to the inactive version of the agent code, bind to the active version of the agent code after comparing the version numbers of the active version of the agent code and the inactive version of the agent code. In one embodiment, when an unauthorized process calls any service provided by the agent, the instance number in the current reloadable module vector is compared with the instance number of the reloadable module vector which the unauthorized process is bound to. If the instance number is different, the unauthorized process must bind with this new reloadable module vector. This second binding process requires the count in the reloadable module vector to be incremented, and a new record of this unauthorized process using this reloadable module vector instance to be created. This process will now have two or more records bound to two or more reloadable module vectors. The unauthorized process is now using the updated agent code. After binding step 222 is completed, the method continues to decrementing step 224.

At decrementing step 224, an agent count associated with the inactive version of the agent code decrements when the exit point is driven. In one embodiment, the agent count is managed by the reloadable module vector. The exit decrements the count of all reloadable module vectors that it was bound to. This can be accomplished by iterating over the records that the process created when binding to the reloadable module vectors. On z/OS, this can be accomplished by constructing a name token for each reloadable module vector that the process could have been bound to by getting the current reloadable module vector instance number and building name tokens using the instance number and continuing down to instance number zero. If the name token exists, then the process needs to decrement the count for this reloadable module vector.

The address of the reloadable module vector instance is located by finding the address that was stored when the reloadable module vector was refreshed. On z/OS this is accomplished by finding the name token which was created when the vector was updated. The exit must decrement the count in the vector, and check the active bit in the vector. This should be done atomically. The inactive version of the agent code is deallocated when the agent count is decremented to zero. After decrementing step 224 is completed, the method continues to deallocating step 226.

At deallocating step 226, a portion of the system memory used by the inactive version of the agent code is deallocated when none of the client instances are bound to the inactive version of the agent code. In one embodiment, if the count has reached zero, and the active bit is unset, the dynamic extension can be unloaded from common storage. Unloading the dynamic modules from common storage as the registered address spaces terminate prevents the code from being deleted while it is still in use, and can allow for many updates to the agent code without running out of common storage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for dynamically updating agent code managed by an authorized agent, the system comprising:
   a system memory;
      a computer processor coupled to the system memory;
      an executing unit coupled to the computer processor, the executing unit to execute multiple versions of agent code in the system memory, wherein one version of the agent code is executed as an active version and another version of the agent code is executed as an inactive version;
      a storing unit to store version numbers of the active version of the agent code and the inactive version of the agent code in a reloadable module vector;
   a binding unit to bind client instances previously bound to the inactive version of the agent code to the active version of the agent code after comparing the version numbers of the active version of the agent code and the inactive version of the agent code; and
   a deallocating unit to deallocate a portion of the system memory used by the inactive version of the agent code when none of the client instances are bound to the inactive version of the agent code;
   wherein the computer processor is configured to register an exit point which is driven when the client instance terminates;
   wherein the computer processor is configured to decrement an agent count associated with the inactive version of the agent code when the exit point is driven, the agent count managed by the reloadable module vector; and
   wherein the inactive version of the agent code is deallocated when the agent count is decremented to zero.

2. The system of claim 1, further comprising:
   wherein the computer processor is configured to store a core component of the agent code in private storage of the system memory and a dynamic component of the agent code in common storage of the system memory; and wherein the core component of the agent code is configured to update the dynamic component of the agent code;
wherein the private storage of the system memory is configured to be used by a single executing process; and
wherein the common storage of the system memory is configured to be used by multiple executing processes.

3. The system of claim 2, wherein the computer processor is configured to load a new version of the agent code stored in the common storage through the core component of the agent code.

4. The system of claim 3, wherein the computer processor is configured to increment an agent count associated with the new version of the agent code when the client instance is bound to the new version of the agent code.

5. The system of claim 2, wherein the computer processor is configured to store a pointer to the dynamic component of the agent code in the reloadable module vector.

6. The system of claim 5, further comprising:
wherein the computer processor is configured to expose, by the reloadable module vector, an interface to the client instance to perform operating system functions through the dynamic component of the agent code; and
wherein the agent code has authorization by an operating system to perform the operating system functions and the client instance does not have authorization by the operating system to perform the operating system functions.

7. The system of claim 3, further comprising:
wherein the computer processor is configured to designate the new version of agent code as active by comparing the version numbers of the new version of the agent code and the active version of agent code; and
wherein if the version numbers are different, setting an active flag associated with the new version of the agent code as true and an active flag associated with the active version of the agent code as false.

8. A computer program product for dynamically updating code managed by an authorized agent, the computer program product comprising:
a non-transitory computer readable storage medium having computer readable program code embodied therewith, the computer readable program code configured to:
execute multiple versions of agent code in a system memory, wherein one version of the agent code is executed as an active version and another version of the agent code is executed as an inactive version;
store version numbers of the active version of the agent code and the inactive version of the agent code in a reloadable module vector;
bind client instances previously bound to the inactive version of the agent code to the active version of the agent code after comparing the version numbers of the active version of the agent code and the inactive version of the agent code; and
deallocate a portion of the system memory used by the inactive version of the agent code when none of the client instances are bound to the inactive version of the agent code;
register an exit point which is driven when the client instance terminates;
decrement an agent count associated with the inactive version of the agent code when the exit point is driven, the agent count managed by the reloadable module vector; and
wherein the inactive version of the agent code is deallocated when the agent count is decremented to zero.

9. The computer program product of claim 8, further comprising computer readable program code to:
store a core component of the agent code in private storage of the system memory and a dynamic component of the agent code in common storage of the system memory; and
wherein the core component of the agent code is configured to update the dynamic component of the agent code;
wherein the private storage of the system memory is configured to be used by a single executing process; and
wherein the common storage of the system memory is configured to be used by multiple executing processes.

10. The computer program product of claim 9, further comprising computer readable program code to load a new version of the agent code stored in the common storage through the core component of the agent code.

11. The computer program product of claim 10, further comprising computer readable program code to increment an agent count associated with the new version of the agent code when the client instance is bound to the new version of the agent code.

12. The computer program product of claim 9, further comprising computer readable program code to store a pointer to the dynamic component of the agent code in the reloadable module vector.

13. The computer program product of claim 12, further comprising computer readable program code to:
expose, by the reloadable module vector, an interface to the client instance to perform operating system functions through the dynamic component of the agent code; and
wherein the agent code has authorization by an operating system to perform the operating system functions and the client instance does not have authorization by the operating system to perform the operating system functions.

14. A system for dynamically updating agent code managed by an authorized agent, the system comprising:
a system memory;
a computer processor coupled to the system memory;
an executing unit coupled to the computer processor, the executing unit to execute multiple versions of agent code in the system memory, wherein one version of the agent code is executed as an active version and another version of the agent code is executed as an inactive version;
a storing unit to store version numbers of the active version of the agent code and the inactive version of the agent code in a reloadable module vector;
a binding unit to bind client instances previously bound to the inactive version of the agent code to the active version of the agent code after comparing the version numbers of the active version of the agent code and the inactive version of the agent code; and
a deallocating unit to deallocate a portion of the system memory used by the inactive version of the agent code when none of the client instances are bound to the inactive version of the agent code;
wherein the computer processor is configured to store a core component of the agent code in private storage of the system memory and a dynamic component of the agent code in common storage of the system memory;
wherein the core component of the agent code is configured to update the dynamic component of the agent code;

wherein the private storage of the system memory is configured to be used by a single executing process; and wherein the common storage of the system memory is configured to be used by multiple executing processes;

wherein the computer processor is configured to load a new version of the agent code stored in the common storage through the core component of the agent code;

wherein the computer processor is configured to designate the new version of agent code as active by comparing the version numbers of the new version of the agent code and the active version of agent code; and wherein if the version numbers are different, setting an active flag associated with the new version of the agent code as true and an active flag associated with the active version of the agent code as false.

15. The system of claim 14, wherein the computer processor is configured to increment an agent count associated with the new version of the agent code when the client instance is bound to the new version of the agent code.

16. The system of claim 14, wherein the computer processor is configured to store a pointer to the dynamic component of the agent code in the reloadable module vector.

17. The system of claim 16, further comprising:

wherein the computer processor is configured to expose, by the reloadable module vector, an interface to the client instance to perform operating system functions through the dynamic component of the agent code; and wherein the agent code has authorization by an operating system to perform the operating system functions and the client instance does not have authorization by the operating system to perform the operating system functions.

18. The system of claim 14, wherein the computer processor is configured to register an exit point which is driven when the client instance terminates.

* * * * *